United States Patent
Schmidt et al.

(10) Patent No.: US 9,658,079 B2
(45) Date of Patent: May 23, 2017

(54) ACCELEROMETER SYSTEM AND METHOD

(75) Inventors: Alexander Schmidt, Halle (DE); Stefan Kreim, Leipzig (DE); Tom Winkler, Leipzig (DE)

(73) Assignee: TomTom Telematics B.V., Amsterdam (NL)

(*) Notice: Subject to any disclaimer, the term of this patent is extended or adjusted under 35 U.S.C. 154(b) by 814 days.

(21) Appl. No.: 13/383,252

(22) PCT Filed: Jul. 10, 2009

(86) PCT No.: PCT/EP2009/058825
§ 371 (c)(1),
(2), (4) Date: May 7, 2012

(87) PCT Pub. No.: WO2011/003461
PCT Pub. Date: Jan. 13, 2011

(65) Prior Publication Data
US 2012/0221276 A1    Aug. 30, 2012

(51) Int. Cl.
*G01C 19/00*    (2013.01)
*G01C 25/00*    (2006.01)
*G01C 21/16*    (2006.01)
*G01P 21/00*    (2006.01)

(52) U.S. Cl.
CPC ......... *G01C 25/005* (2013.01); *G01C 21/165* (2013.01); *G01P 21/00* (2013.01)

(58) Field of Classification Search
None
See application file for complete search history.

(56) References Cited

U.S. PATENT DOCUMENTS 6,308,134 B1 * 10/2001 Croyle .................. G01C 21/16
                                                340/990
6,532,419 B1 *  3/2003 Begin et al. ................. 701/504
6,633,255 B2 * 10/2003 Krasner ............... G01S 5/0027
                                                342/357.63
7,057,551 B1    6/2006 Vogt
(Continued)

FOREIGN PATENT DOCUMENTS

EP    0838660 A1    4/1998
WO    00/17607 A1    3/2000
WO    2009063400 A2    5/2009

OTHER PUBLICATIONS

International Search Report issued Apr. 9, 2010 for International application No. PCT/EP2009/058825.
(Continued)

*Primary Examiner* — Aditya Bhat (57) ABSTRACT

A vehicle accelerometer system comprises an accelerometer (290) for installation in a vehicle (500), a processor (210) for selection of accelerometer output data items for inclusion in an accelerometer output data set representative of measurements by the accelerometer (290) at a plurality of different vehicle locations, each accelerometer output data item being representative of a respective measurement by the accelerometer (290), and a storage device (230) for storing the accelerometer output data set, wherein the processor (210) is configured to process the accelerometer output data set to determine an orientation output representative of the orientation of the accelerometer (290) with respect to the vehicle (500).

18 Claims, 7 Drawing Sheets

(56) References Cited

U.S. PATENT DOCUMENTS

| | | | |
|---|---|---|---|
| 2007/0068273 A1* | 3/2007 | Cunningham | G01L 3/247 73/781 |
| 2008/0208501 A1 | 8/2008 | Fiedler et al. | |
| 2009/0030605 A1* | 1/2009 | Breed | B60N 2/2863 701/532 |
| 2010/0198511 A1* | 8/2010 | Hunter et al. | 701/216 |

OTHER PUBLICATIONS

International Search Report issued Apr. 14, 2010 for International Application No. PCT/EP2009/058826.

* cited by examiner

ACCELEROMETER SYSTEM AND METHOD

This application is the National Stage of International Application No. PCT/EP2009/088825, filed Jul. 10, 2009 and designating the United States. The entire contents of this application is incorporated herein by reference.

FIELD OF THE INVENTION

The present invention relates to an accelerometer system and method, and in particular to an accelerometer and method for installation or use in a vehicle. The invention may be of particular relevance to an accelerometer that is included in or configured to communicate with a navigation device.

BACKGROUND OF THE INVENTION

Navigation devices that include GPS (Global Positioning System) signal reception and processing functionality are well known and are widely employed as in-car or other vehicle navigation systems.

In general terms, a modern navigation device may comprise a processor, memory (at least one of volatile and non-volatile, and commonly both), and map data stored within said memory. The processor and memory usually cooperate to provide an execution environment in which a software operating system may be established, and additionally it is commonplace for one or more additional software programs to be provided to enable the functionality of the navigation device to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In one arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

Navigation devices of this type also usually include a GPS antenna by means of which satellite-broadcast signals, including location data, can be received and subsequently processed to determine a current location of the device.

The navigation device may also include or be configured to communicate with angular or linear accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in navigation devices if it is expedient to do so. Accelerometer data may be stored and used to determine whether any exceptional driving events (for example, harsh braking or acceleration, swerving or other emergency manoeuvres) have occurred during a period of time.

Accelerometers may also be included in black box devices for vehicles, which do not provide navigation functions but log location, speed, acceleration and other vehicle data for transmission to a central server. Such devices are often included in commercial vehicles such as lorries, buses and taxis for monitoring purposes.

The position of installation of a navigation device, or other telematic device inside a vehicle is important, as internal antennas of the device are directly influenced by the position. For example a GPS antenna should have a clear view to the sky, and if it is located on one side of the device, that side should be the "upper side" when it is installed.

Furthermore, it is necessary to know the orientation of an accelerometer accurately in order to correctly process acceleration data from the accelerometer, and to correctly detect driving events such as curve driving or harsh braking or acceleration. Another problem is that accelerometers are often susceptible to temperature fluctuations, resulting in changes of measured acceleration data.

In known systems the installation position and orientation of a telematic device with respect to a vehicle is usually unknown, and the bearing and orientation of the vehicle with respect to the ground is unknown and frequently changes.

At present the installation position of a telematic and/or accelerometer device is determined by manual calibration, for example by manually pressing a button when the device is being installed and fixed to the car by the installer. At the time of calibration all relevant environmental conditions are known and can be used to calibrate the device correctly. Such calibrations are also usually performed on level ground, and the output of the accelerometer device can thus be calibrated.

Manual calibrations are time-consuming and subsequent variations in environmental conditions (for example, seasonal or daily variations in temperature) can subsequently cause inaccuracies. Furthermore, if the initial calibration is carried out inaccurately or if the orientation of a device changes after installation, there may be persistent, systematic inaccuracies in operation of the device.

SUMMARY OF THE INVENTION

According to a first aspect of the present invention, there is provided a vehicle accelerometer system comprising an accelerometer for installation in a vehicle; a processor for selection of accelerometer output data items for inclusion in an accelerometer output data set representative of measurements by the accelerometer at a plurality of different vehicle locations, each accelerometer output data item being representative of a respective measurement by the accelerometer; and a storage device for storing the accelerometer output data set, wherein the processor is configured to process the accelerometer output data set to determine an orientation output representative of the orientation of the accelerometer with respect to the vehicle.

By storing and processing accelerometer output data items from a plurality of different locations, the effect on the processing of the accelerometer output data of the vehicle not being on level ground for any one of the locations may be eliminated or compensated for. The average slope of the ground across a plurality of locations will tend towards zero as the number of locations increases.

The processor may operable to communicate with the accelerometer and/or may be configured in operation to receive data from the accelerometer, for example via a wired or wireless communication link. The processor may be configured to provide an output signal representative of the orientation output.

The orientation output may be the orientation of the accelerometer with respect to the vehicle. The orientation may be expressed as a set of angular values. The orientation output may be representative of the pitch and/or roll of the accelerometer with respect to the vehicle.

The orientation output may comprise a reference output representative of the output from the accelerometer when the vehicle is on level ground. The reference output may, for example, be suitable for subtraction from future accelerometer outputs in order to correct those future accelerometer outputs for the orientation of the accelerometer with respect to the vehicle.

The processing of the accelerometer output data set may comprise fitting the accelerometer output data set to a function and/or the processing may comprise determining a mean or median value of the accelerometer measurements represented by the accelerometer output data set, and using the determined mean or median value to determine the orientation output. Effects due to the inclination of the ground for any one of the measurements may be eliminated by obtaining a mean or median value across all measurements. The orientation output may comprise the mean or median value of the accelerometer measurements.

The system may comprise or be configured to communicate with a location determining unit. The location determining unit may be installed in the vehicle and/or may be for determining the location of the vehicle. The processor may be configured to determine vehicle speed and/or location from measurement data obtained from the location determining unit.

The processor may be configured to select an accelerometer output data item for inclusion in the accelerometer output data set in dependence on the speed of the vehicle at the time of the accelerometer measurement. The system may comprise speed determining means for determining the speed of the vehicle at the time of the accelerometer measurement. The speed determining means may determine the speed from the variation with time of the location determined by the location determining unit.

Each output data item included in the accelerometer output data set may be representative of a respective measurement by the accelerometer when the vehicle is substantially stationary. The system may comprise means for determining if the vehicle is substantially stationary. The means for determining if the vehicle is substantially stationary may comprise or may be configured to communicate with a or the location determining unit.

The processor may be configured to select an accelerometer output data item for inclusion in the accelerometer output data set in dependence on the location of the vehicle at the time of the accelerometer measurement. The location of the vehicle at the time of the accelerometer measurement may be determined by the location determining unit.

The processor may be configured to select an accelerometer output data item for inclusion in the accelerometer output data set in dependence on the separation of the location of the vehicle at the time of the measurement from the location of the vehicle at the time of measurements represented by other output data items.

The processor may be configured to select accelerometer output data items so that each accelerometer data item is representative of a measurement at a location that is separated from the location of each other measurement represented by an accelerometer data item included in the accelerometer data set by at least a threshold separation distance. The threshold separation distance may be greater than or substantially equal to at least one of 50m, 100m and 200m. Thus, it can be ensured that errors arising from basing the determination of orientation upon measurements that are obtained at closely spaced locations, which may not have an average slope of zero, are reduced or eliminated.

The system may comprise means for determining the value of at least one environmental parameter. The processor may be configured to select an accelerometer output data item for inclusion in the accelerometer output data set in dependence on the value of an environmental parameter at the time of the accelerometer measurement. The processor may be configured to select an accelerometer output data item for inclusion in the accelerometer output data set in dependence on a comparison between the value of the environmental parameter and at least one threshold. Thus, possible errors arising from the effects of variation of the value of an environmental parameter on operation of the accelerometer may be reduced or eliminated.

The processor may be configured to provide a plurality of accelerometer output data sets each corresponding to a respective range or value of an environmental parameter, and to process each accelerometer output data set to determine a reference output for each range or value of the environmental parameter.

The processor may be configured to select one of the accelerometer output data sets in which to include an accelerometer output data item in dependence on the value of the environmental parameter at the time of the accelerometer measurement represented by that accelerometer output data item. The environmental parameter may comprise temperature.

The processor may be configured to process the accelerometer output data set to determine the orientation output if the number of output data items in the accelerometer output data set is greater than a predetermined threshold.

The processor may be configured to remove accelerometer output data items that are representative of old accelerometer measurements from the accelerometer output data set. The processor may be configured to remove accelerometer output data items that are older than a threshold age. Alternatively or additionally the processor may be configured to maintain a predetermined number of accelerometer output data item in the accelerometer output data set. The number of accelerometer output data item in the accelerometer output data set may be maintained on a first-in-first-out basis.

The processor may be configured to receive an acceleration output data item from the accelerometer and to determine the acceleration of the vehicle in dependence on the acceleration output data item and the orientation output so as to compensate for the orientation of the accelerometer with respect to the vehicle.

In a further independent aspect of the invention there is provided a method of operation of an accelerometer system comprising:- receiving accelerometer output data items from an accelerometer, each accelerometer output data item being representative of a respective measurement by the accelerometer; selecting a plurality of the accelerometer output data items for inclusion in an accelerometer output data set; storing the accelerometer output data set; and processing the accelerometer output data set to determine an orientation output representative of the orientation of the accelerometer with respect to the vehicle.

In another independent aspect of the invention there is provided a computer program product comprising computer readable instructions executable to put into effect a method as claimed or described herein.

Any feature in one aspect of the invention may be applied to other aspects of the invention, in any appropriate combination. In particular, apparatus features may be applied to method features and vice versa.

BRIEF DESCRIPTION OF THE DRAWINGS

At least one embodiment of the invention will now be described, by way of example only, with reference to the accompanying drawings, in which.

DETAILED DESCRIPTION OF EMBODIMENTS

Embodiments of the present invention will now be described with particular reference to a system that comprises a navigation device that includes an accelerometer or is configured to communicate with an accelerometer. The teachings of the present invention are not limited to such systems but are instead universally applicable to any type of accelerometer system. Furthermore, in the embodiments described below the navigation device is installed permanently in a vehicle, for example by an original equipment manufacturer. In alternative embodiments, the navigation device may be (without limitation) any type of route planning and/or navigation device, irrespective of whether that device is embodied as a portable navigation device (PND), a navigation device built into a vehicle, or indeed a computing resource (such as a desktop or portable personal computer (PC), mobile telephone or portable digital assistant (PDA)) executing route planning and/or navigation software.

Features of a navigation device will be described first, with reference to FIGS. 1 to 5. Features of an accelerometer that is included in or associated with the navigation device will then be described with reference to FIGS. 6 to 11.

Figure 1:
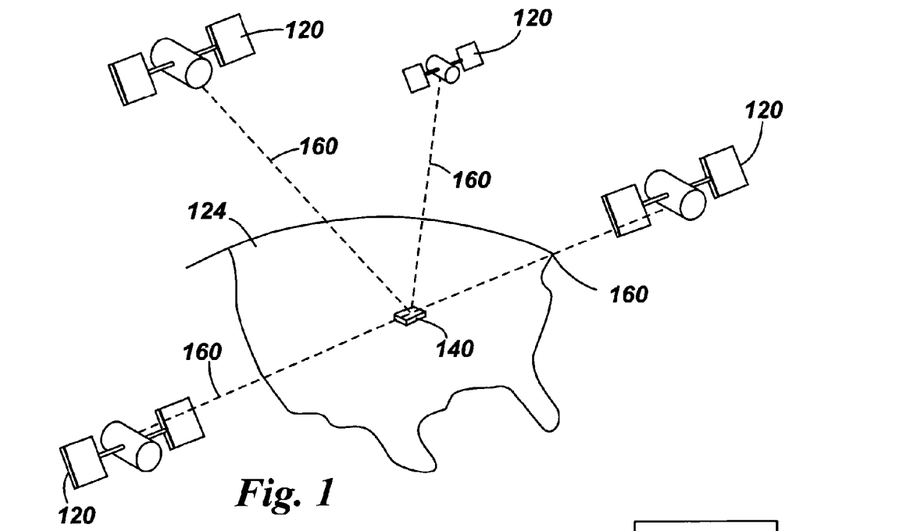
FIG. 1 is a schematic illustration of a Global Positioning System (GPS) usable by a navigation device.

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
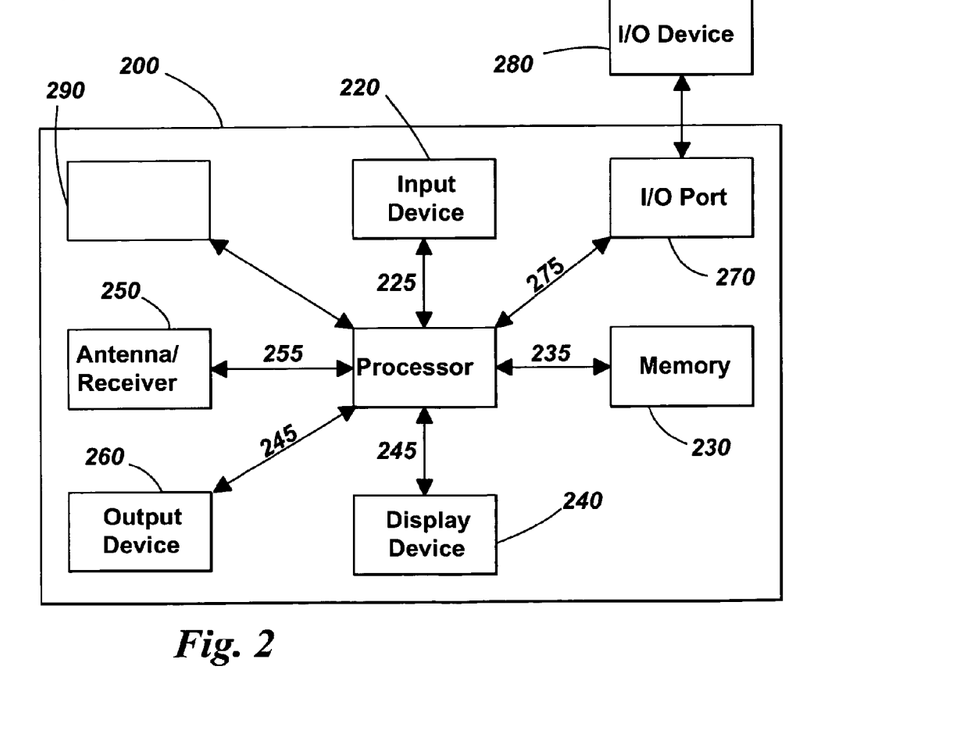
FIG. 2 is a schematic illustration of electronic components of a navigation device.

FIG. 2 is an illustrative representation of electronic components of a navigation device 200 according to an embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In one arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

The navigation device includes an accelerometer 290, and the processor 210 is configured to communicate with the accelerometer as described in more detail below.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like.

Figure 3:
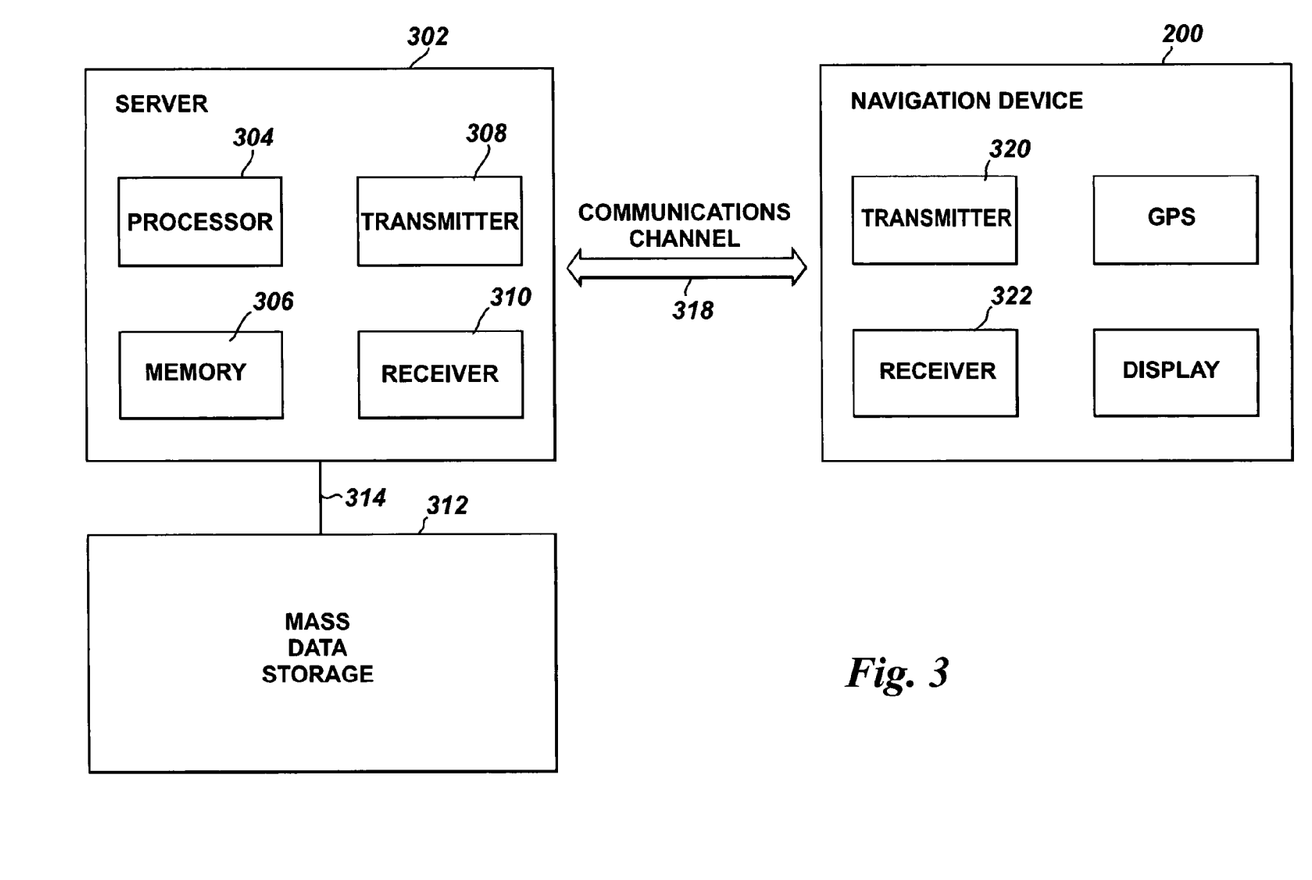
FIG. 3 is a schematic diagram of a communications system including a wireless communication channel for communication with the navigation device.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4:
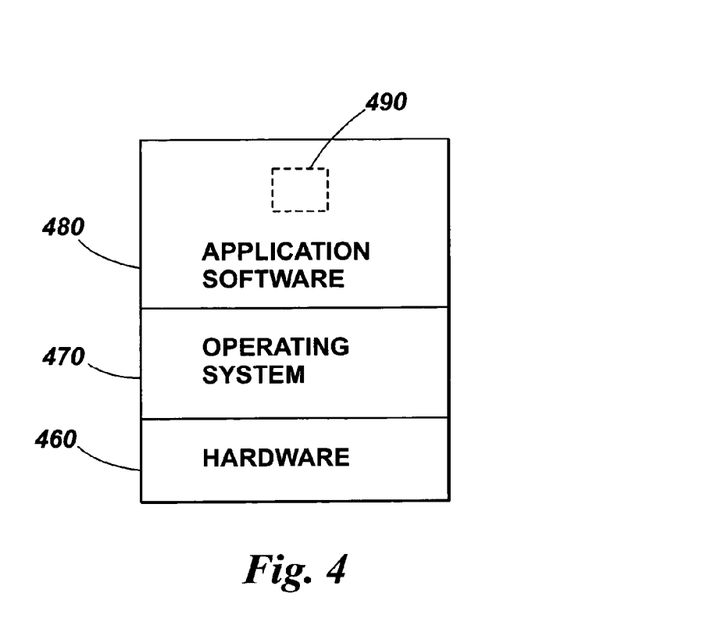
FIG. 4 is a schematic representation of an architectural stack of the navigation device of FIG. 2.

Referring now to FIG. 4 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith.

The application software 480 also includes an accelerometer module 490 that is configured to receive and process accelerometer data from the accelerometer 290. The function and operation of the accelerometer module 490 is described in more detail below.

Figure 5:
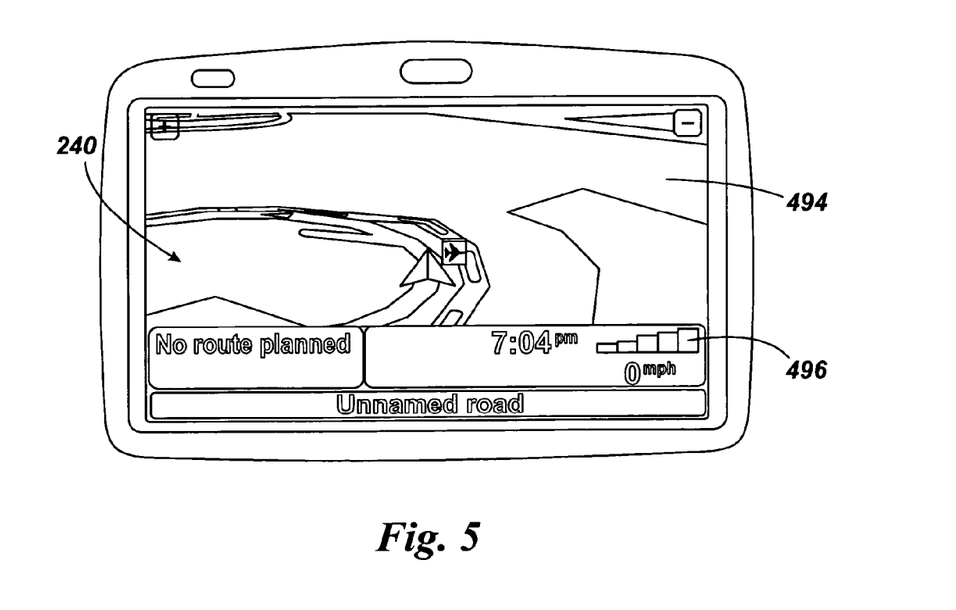
FIG. 5 is an illustrative screenshot from the navigation device of FIG. 2.

When the user switches on the device 200, the device 200 acquires a GPS fix and calculates (in a known manner) the current location of the navigation device 200. The location is calculated using a location determining unit comprising the antenna/receiver 250, the connection 255 and a location determining module (not shown) included in the processor 210. The user is then presented, as shown in FIG. 5, with a view in pseudo three dimensions on a touch screen display 240 of the local environment 494 in which the navigation device 200 is determined to be located, and in a region 496 of the display 240 below the local environment a series of control and status messages. The device 200 provides route planning, mapping and navigation functions to the user, in dependence on user input provided by a series of interlinked soft or virtual buttons and menu screens that can be displayed on the display 240. The device 200 continues to determine its location using the location determination unit on an ongoing basis whilst it is operational.

The accelerometer in certain embodiments is a three-axis accelerometer and measures acceleration along each of three orthogonal axes (x, y, z). In alternative embodiments the accelerometer is a one or two axis accelerometer. The accelerometer may be an analogue or digital acceleration sensor and can be of any type. In one embodiment, the accelerometer is a Bosch Sensortec SMB380 triaxial acceleration sensor.

In operation, the accelerometer continuously provides data representing the results of accelerometer measurements to the accelerometer module 490 operating at the processor 210. The data provided by the accelerometer comprises acceleration data for each axis (x, y, z) of the accelerometer. The accelerometer module 490 treats data representative of each measurement as an accelerometer output data item. The measurement may be performed at a single instant, or may be averaged over a period of time. The averaging can be performed by the accelerometer 290 itself or by the accelerometer module 490.

The accelerometer data items are stored in the memory 230 for subsequent transmission to the server 302 and/or processing. In one mode of operation the accelerometer data items are processed either by the accelerometer module 490 or the server 302 in order to identify whether exceptional driving events (for example, harsh braking or acceleration, swerving or other emergency manoeuvres) have occurred during a period of time.

The correct processing of accelerometer data requires that the output from the accelerometer when stationary is known. Each accelerometer data item comprises, or can be processed to provide, a measured acceleration vector a=(ax, ay, az).

If the accelerometer 290 is stationary (not moving), the magnitude of the acceleration vector a=(ax, ay, az) is substantially equal to the Earth's gravity (g) (static acceleration). If the device is being moved, additional forces acting on the accelerometer can be determined from the measured acceleration vector, compensated for the acceleration vector when the device is stationary.

The magnitude of g determined by the accelerometer 290 differs under changing temperatures or other environmental conditions due to the effect of such changing temperatures or other environmental conditions on operation of the accelerometer 290.

Furthermore, the vector components ax, ay and az of the acceleration vector when the device is stationary depend on the orientation of the accelerometer with respect to the ground at that time.

It is an important feature of the embodiment that the accelerometer module 490 is able to determine an orientation output representative of the accelerometer with respect to the vehicle from stored accelerometer output data items, and to use that orientation output in subsequent processing and analysis of accelerometer measurements. An example of the determination of the orientation output is described in relation to FIGS. 6a and 6b.

Figure 6A:
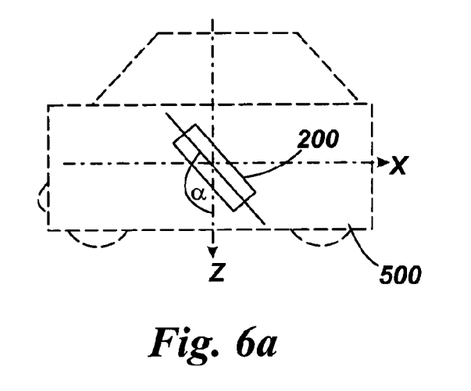
FIGS. 6a and 6b are schematic diagrams showing the orientation of an accelerometer device installed in a vehicle.
Figure 6B:
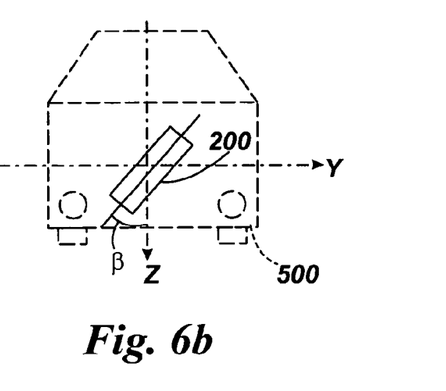

FIGS. 6a and 6b show the device 200 installed in a vehicle 500, in a side view and a head-on view with respect to the vehicle respectively. A vehicle frame of reference when the vehicle is on level ground is illustrated in FIGS. 6a and 6b in which an x axis is aligned with the forward direction of motion of the vehicle, a y axis is aligned at 90° to the x-axis in a horizontal plane, and a z-axis is the vertical axis. It can be seen that in this example the device 200 is oriented at an angle of α° rotated around the y-axis of the vehicle in the x-z plane, and at angle of β° rotated around the x-axis in the z-y plane.

In order to determine automatically an orientation output representative of the orientation of the accelerometer with respect to the vehicle (and thus representative of the angles α° and β° in this example) the accelerator module 490 builds up an accelerometer output data set comprising accelerometer output data items representative of accelerometer measurements taken whilst the vehicle 500 is stationary.

The accelerometer module 490 determines that the vehicle 500 is stationary from GPS data obtained by the device 200. Usually the accelerometer module 490 selects an accelerometer output data item for inclusion in the accelerometer output data set only if at the time of measurement the vehicle 500 has been stationary for greater than a predetermined threshold period of time (for example 20 seconds) to ensure that the accelerometer 290 has settled to its stationary state.

The basis of the determination of the orientation output by the accelerometer module 490 from the accelerator output data set is that the data set includes data resulting from measurements at a sufficient number of different vehicle locations that the mean or median inclination of the ground at the vehicle location at the time of each measurement, across all measurements represented by the data set, is zero.

Figure 7:
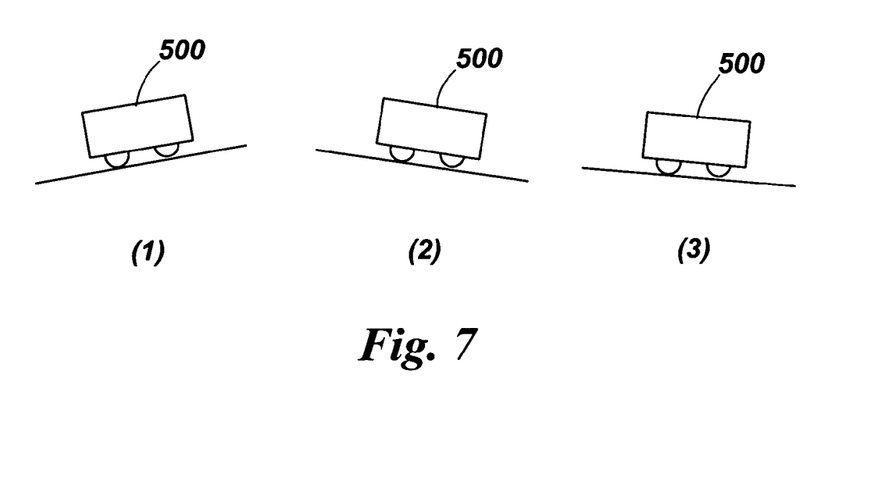
FIG. 7 is a schematic diagram showing illustrating three vehicle locations for which accelerator measurements are included in an accelerometer data set.

FIG. 7 shows three locations for which accelerator measurements are included in the accelerometer data set. It can be seen that at the first location the vehicle 500 is on a slope facing upwards, and at the second two locations the vehicle 500 is on a slope facing downwards.

Figure 8A:
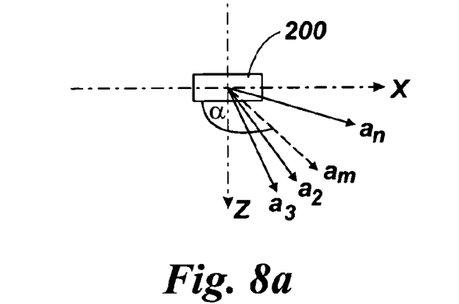
FIGS. 8a and 8b are schematic illustrations showing measured acceleration vectors for the vehicle locations of FIG. 7 with respect to an accelerometer frame of reference.
Figure 8B:
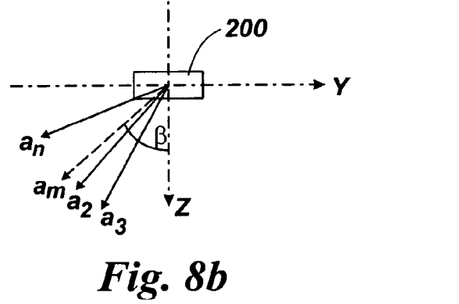

The accelerometer output data items obtained at each of the three locations of FIG. 7 are represented schematically in FIGS. 8a and 8b as the measured acceleration vectors $a_1$ (which represents the accelerometer outputs ax, ay, az measured at position 1), $a_2$ (which represents the accelerometer outputs ax, ay, az measured at position 2) and $a_3$ (which represents the accelerometer outputs ax, ay, az measured at position 3). The acceleration vectors $a_1$, $a_2$ and $a_3$ are shown in FIGS. 8a and 8b with respect to a frame of reference defined relative to the device 200, in the x-z plane and the y-z plane respectively.

The accelerometer module 490 averages the three measured acceleration vectors $a_1$, $a_2$ and $a_3$ in order to obtain an average stationary acceleration vector $a_m$. If measurements obtained from a sufficiently large number of vehicle locations are included in the accelerator output data set, then the average stationary acceleration vector $a_m$ can be taken to represent the acceleration vector that would be measured by the accelerometer if the vehicle was on level ground, as the average inclination of the ground across all measurements tends to zero as the number of measurements, and number of vehicle locations, increases. The average stationary acceleration vector $a_m$ may be used as a reference output for subsequent accelerometer measurements. The accelerometer module 490 may, optionally, calculate the orientation of the device 200 with respect to the vehicle 500 from the average stationary acceleration vector $a_m$.

Figure 9:
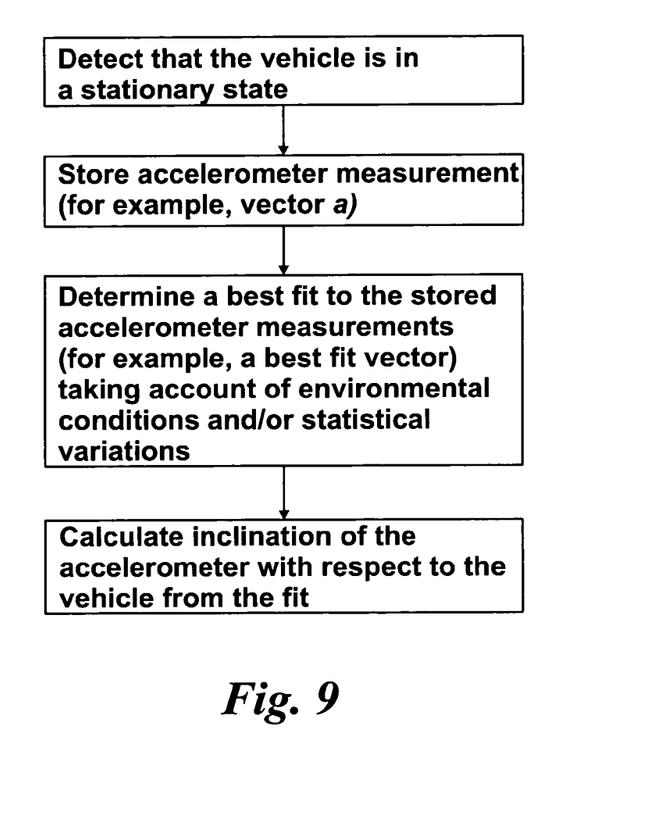
FIG. 9 is a flowchart illustrating one mode of operation of an embodiment.

Operation of the accelerator module 490 is illustrated in overview in the flowchart of FIG. 9.

The accelerometer module 490 can optionally be configured to select measurements for inclusion in the accelerometer output data set only if the vehicle location at the time of the measurements is sufficiently separated from vehicle locations for other measurements included in the data set, for example by greater than a threshold distance (such as 50 m, 100 m or 200 m). That can ensure that the measurement data included in the data set does not originate from clusters of vehicle locations, which could distort the data set and cause the average inclination of the ground across the data set to be not equal to zero.

The accelerometer module 490 can also be configured to delete outliers from the accelerometer data set, or to exclude such outliers from the processing of the accelerometer data set, to ensure that the processing of the data set is not distorted by such outliers.

The accelerometer module 490 is usually configured to update the accelerometer output data set, and to recalculate the average stationary acceleration vector $a_m$ or other orientation output, on an ongoing basis during normal use of the device 200 and vehicle 500. The accelerometer module 490 is configured to maintain a predetermined number of accelerometer output data items in the data set on a first-in-first-out basis and/or is configured to delete accelerometer output data items from the data set when they become older than a predetermined age.

As mentioned above, the accelerometer 290 is sensitive to environmental conditions, for example temperature. In one variant of the embodiment of FIG. 2, the accelerator module is configured to receive temperature data from a temperature sensor (not shown) that is either external to or integrated in the device 200. In one example the temperature sensor is the vehicle's temperature sensor and the device 200 is interfaced to that sensor. The accelerometer module 490 only selects accelerometer output data items for inclusion in the accelerometer data set if the temperature at the time of measurement is below a predetermined maximum temperature and/or above a predetermined minimum temperature (for example between 5° C. and 35° C.). The threshold maximum and minimum values of temperature may be selected in dependence on the normal operating temperature range for the particular accelerometer that is used.

Figure 10:
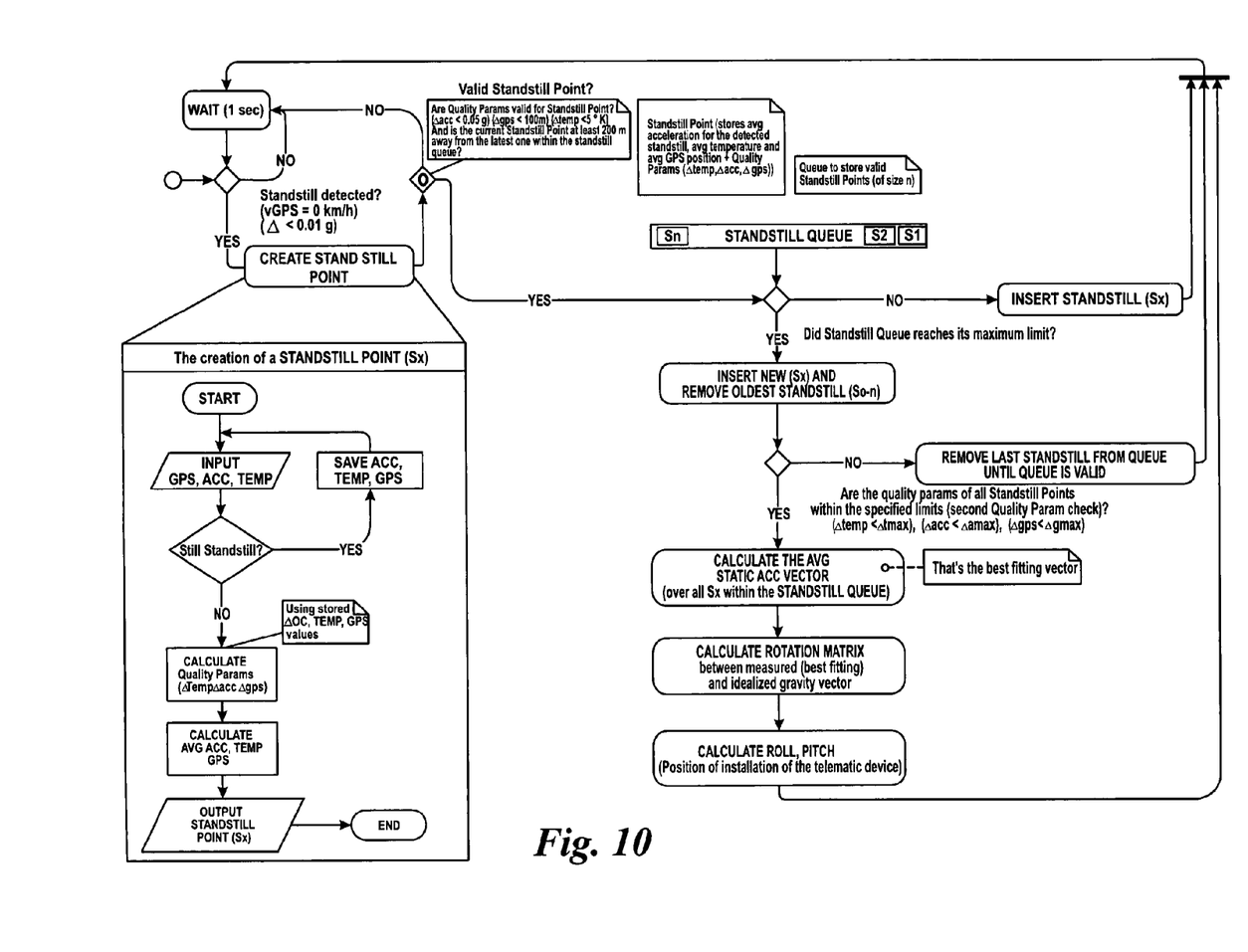
FIG. 10 is a flowchart illustrating a further mode of operation of an embodiment.

Another mode of operation of the accelerometer module 490 is illustrated in the flow chart of FIG. 10. In that example, the accelerometer output data set is referred to as the standstill queue and the accelerometer output data items are referred to as standstill points. The speed of the vehicle determined from GPS measurements is referred to as vGPS, the position determined from GPS measurements is referred to as GPS, and the acceleration determined from the accelerometer is referred to as acc.

The accelerometer module 490 first detects whether the vehicle is in a stationary state. It then determines a standstill point (average static acceleration vector, average temperature, average GPS position, and a quality parameter that represents the variation (Δacc, Δtemp, Δgps) in those parameters during the stationary state) for that stationary state. The accelerometer module 490 then checks that the quality parameter for the standstill point is within predetermined thresholds and that the detected standstill point was obtained for a different location (separated by at least 200 m in the example of FIG. 10) than the last detected standstill point. The standstill point is then stored in the standstill queue.

The standstill queue is maintained on a first-in-first-out basis. Once the standstill queue is full, the quality parameters of the standstill points are checked again to confirm that they are within predetermined thresholds, and if so the average or best fit static acceleration vector (taking account of environmental conditions and statistical variations) is then determined from the standstill points. A rotation matrix is determined that represent the difference between the calculated average static acceleration vector the acceleration vector that would be obtained if the accelerometer axes were aligned with the vehicle axes (referred to as the idealized gravity vector). The orientation of the accelerometer with respect to the vehicle is then calculated from the rotation matrix, and expressed as a roll and pitch. The yaw of the accelerometer with respect to the vehicle in that example may subsequently be determined using another procedure, for example comparison of a GPS trajectory with accelerometer output data corrected for the calculated roll and pitch.

In another variant of the embodiment of FIG. 2, the accelerometer module 490 builds up an accelerometer output data set, and determines an orientation output, for each of a plurality of temperature bands (for example 0° C. to 10° C., 10° C. to 20° C., 20° C. to 30° C.). The accelerometer module 490 includes an accelerometer output data item in one or other of the data sets in dependence on the temperature at the time of measurement for that data item. In processing subsequent accelerometer measurements, the accelerometer module 490 selects the orientation output corresponding to a particular temperature band for use in that processing in dependence on the measured temperature at the time of those subsequent measurements.

The orientation of the accelerometer 290 with respect to the vehicle 500 determined by the accelerometer module 490 can also be provided by the accelerometer module 490 to the location determining unit for use in location determination. In embodiments in which the accelerometer 290 forms an integral part of the device 200 and is in a known orientation with respect to antennas or other components of the location determination unit, the orientation can be used to control or optimise reception or processing of GPS or other signals.

Figure 11:
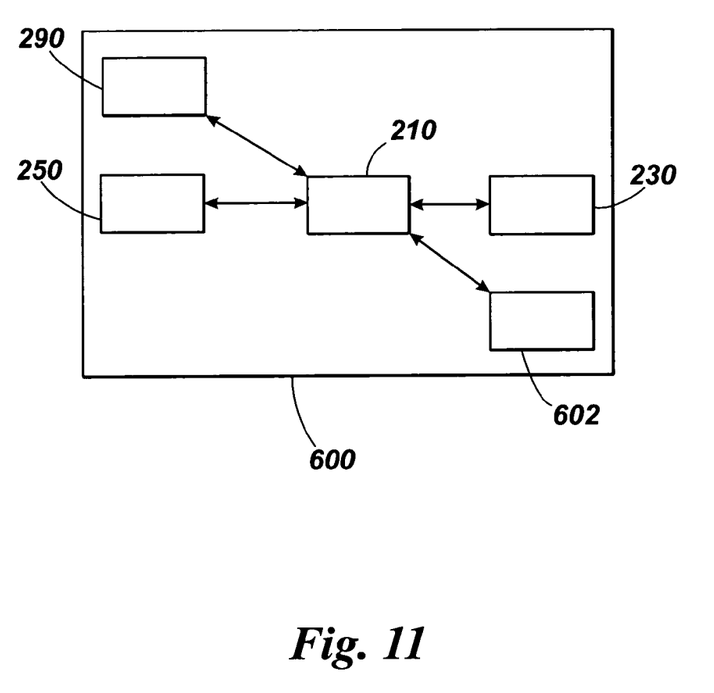
FIG. 11 is a schematic illustration of an alternative embodiment in which an accelerometer is included in a data logger device.

In the embodiment of FIG. 2, the accelerometer 290 is integrated in, or in communication with, a navigation device that provides navigation functions to a user under control of the user. In alternative embodiments, the accelerometer is included in a data logger device that logs location data and/or accelerometer data and/or other vehicle data and communicates such data to the server 302. An example of such an alternative embodiment is illustrated in FIG. 11, which shows a black-box type device 600 for installation in a vehicle.

The device 600 includes some of the components of the device 200, including the accelerometer 290, the processor 210, the memory 230, and the antenna/receiver 250. The temperature or other environmental sensor 602 is also shown in FIG. 11. The device 600 is optionally also able to interface with vehicle systems to obtain and log other vehicle data. The location-determining and accelerometer functions of device 600 are as described in relation to the device 200 of FIG. 2, but the device 600 does not provide navigation or display functions to the driver of a vehicle but instead logs and transmits data to the server 302 for subsequent analysis. The device 600 is particularly suitable for installation in a commercial vehicle. Both the device 600 and the device 200 may be used in commercial vehicle and fleet management systems, for example the TomTom Work and TomTom Webfleet systems.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst embodiments described herein implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be understood that the present invention has been described above purely by way of example, and modifications of detail can be made within the scope of the invention.

Each feature disclosed in the description, and (where appropriate) the claims and drawings may be provided independently or in any appropriate combination.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A vehicle accelerometer system for communicating with a navigation device comprising:
   an accelerometer, wherein the accelerometer is installable in a vehicle;
   a processor configured to select accelerometer output data items for inclusion in an accelerometer output data set representative of measurements by the accelerometer at a plurality of different vehicle locations, each accelerometer output data item being representative of a respective measurement by the accelerometer while the vehicle is in motion, the processor being configured to select an accelerometer output data item for inclusion in the accelerometer output data set based at least in part on the speed of the vehicle at the time of the accelerometer measurement; and
   a storage device for storing the accelerometer output data set,
   wherein the processor is configured to process the accelerometer output data set to determine an orientation output representative of the orientation of the accelerometer with respect to the vehicle, and wherein the orientation output comprises a reference output representative of the output from the accelerometer when the vehicle is on level ground;
   wherein the processor is configured to correct the accelerometer output data set based on the reference output representative of the orientation of the accelerometer;
   wherein the processor is configured to communicate the corrected accelerometer output data set to the navigation device.

2. A system according to claim 1, wherein the the processor is configured to determine a mean or median value of the accelerometer measurements represented by the accelerometer output data set, and to use the determined mean or median value to determine the orientation output.

3. A system according to claim 1, wherein each output data item included in the accelerometer output data set is representative of a respective measurement by the accelerometer when the vehicle is stationary.

4. A system according to claim 1, wherein the processor is configured to select an accelerometer output data item for inclusion in the accelerometer output data set in dependence on the location of the vehicle at the time of the accelerometer measurement.

5. A system according to claim 1, wherein the processor is configured to select an accelerometer output data item for inclusion in the accelerometer output data set in dependence on the separation of the location of the vehicle at the time of the measurement from the location of the vehicle at the time of measurements represented by other output data items.

6. A system according to claim 1, wherein the processor is configured to select an accelerometer output data item for inclusion in the accelerometer output data set in dependence on the value of an environmental parameter at the time of the accelerometer measurement.

7. A system according to claim 6, wherein the environmental parameter comprises temperature.

8. A system according to claim 1, wherein the processor is configured to provide a plurality of accelerometer output data sets each corresponding to a respective range or value of an environmental parameter, and to process each accelerometer output data set to determine a reference output for each range or value of the environmental parameter.

9. A system according to claim 8, wherein the processor is configured to select one of the accelerometer output data sets in which to include an accelerometer output data item in dependence on the value of the environmental parameter at the time of the accelerometer measurement represented by that accelerometer output data item.

10. A system according to claim 1, wherein the processor is configured to process the accelerometer output data set to determine the orientation output if the number of output data items in the accelerometer output data set is greater than a predetermined threshold.

11. A system according to claim 1, wherein the processor is configured to remove accelerometer output data items that are representative of old accelerometer measurements from the accelerometer output data set.

12. A system according to claim 1, wherein the processor is configured to receive an acceleration output data item from the accelerometer and to determine the acceleration of the vehicle in dependence on the acceleration output data item and the orientation output so as to compensate for the orientation of the accelerometer with respect to the vehicle.

13. A system according to claim 1, further comprising means for determining the speed of the vehicle at the time of the accelerometer measurement based on GPS data obtained from a location determining unit.

14. A system according to claim 1, wherein the processor is configured for selecting the accelerometer output data items for inclusion in the accelerometer output data set by carrying out one of more of:
   determining a standstill point when the vehicle is in a stationary state, the standstill point comprising a current physical location of the vehicle;
   comparing the current physical location to a physical location associated with one or more previous standstill points to determine if the standstill point is separated by at least a threshold distance from the one or more previous standstill points; and
   selecting a corresponding accelerometer output data item for inclusion in the accelerometer output data set when the standstill point is separated by at least the threshold distance from the one or more previous standstill points.

15. A system according to claim 14, wherein the processor is configured to perform the processing of the accelerometer output data set to determine an orientation output representative of the orientation of the accelerometer with respect to the vehicle by carrying out one or more of:
   determining, when the accelerometer output data has been selected for inclusion in the accelerometer output data set for a predetermined number of standstill points, the orientation output representative of the orientation of the accelerometer with respect to the vehicle based at least in part on an average acceleration vector computed using the accelerometer output data from the accelerometer output data set.

16. A system according to claim 7, further comprising receiving temperature data from a temperature sensor, and selecting accelerometer output data items for inclusion in the output accelerometer data set depending upon the temperature data.

17. A method of operation of an accelerometer system comprising:
   receiving accelerometer output data items from an accelerometer as the accelerometer is in motion, each accelerometer output data item being representative of a respective measurement by the accelerometer at a different location;
   selecting a plurality of the accelerometer output data items for inclusion in an accelerometer output data set, wherein the selection of accelerometer output data items for inclusion in the accelerometer output data set is made based at least in part on the speed of the vehicle at the time of the accelerometer measurement;
   storing the accelerometer output data set;
   processing the accelerometer output data set to determine an orientation output representative of the orientation of the accelerometer with respect to a vehicle, wherein the orientation output comprises a reference output representative of the output from the accelerometer when the vehicle is on level ground;
   correcting the accelerometer output data set based on the reference output: and communicating the accelerometer output data set to the navigation device.

18. A computer program product comprising computer readable instructions that are executable to cause a computer to perform a method according to claim 17.

* * * * *